July 15, 1958  T. R. SHUKAY  2,842,869
APPARATUS FOR ANALYZING SHOCK WAVE PATTERNS
Filed April 21, 1954  2 Sheets-Sheet 1

INVENTOR.
Thomas R. Shukay
BY
Morgan, Finnegan, Durham & Pine
his ATTORNEYS

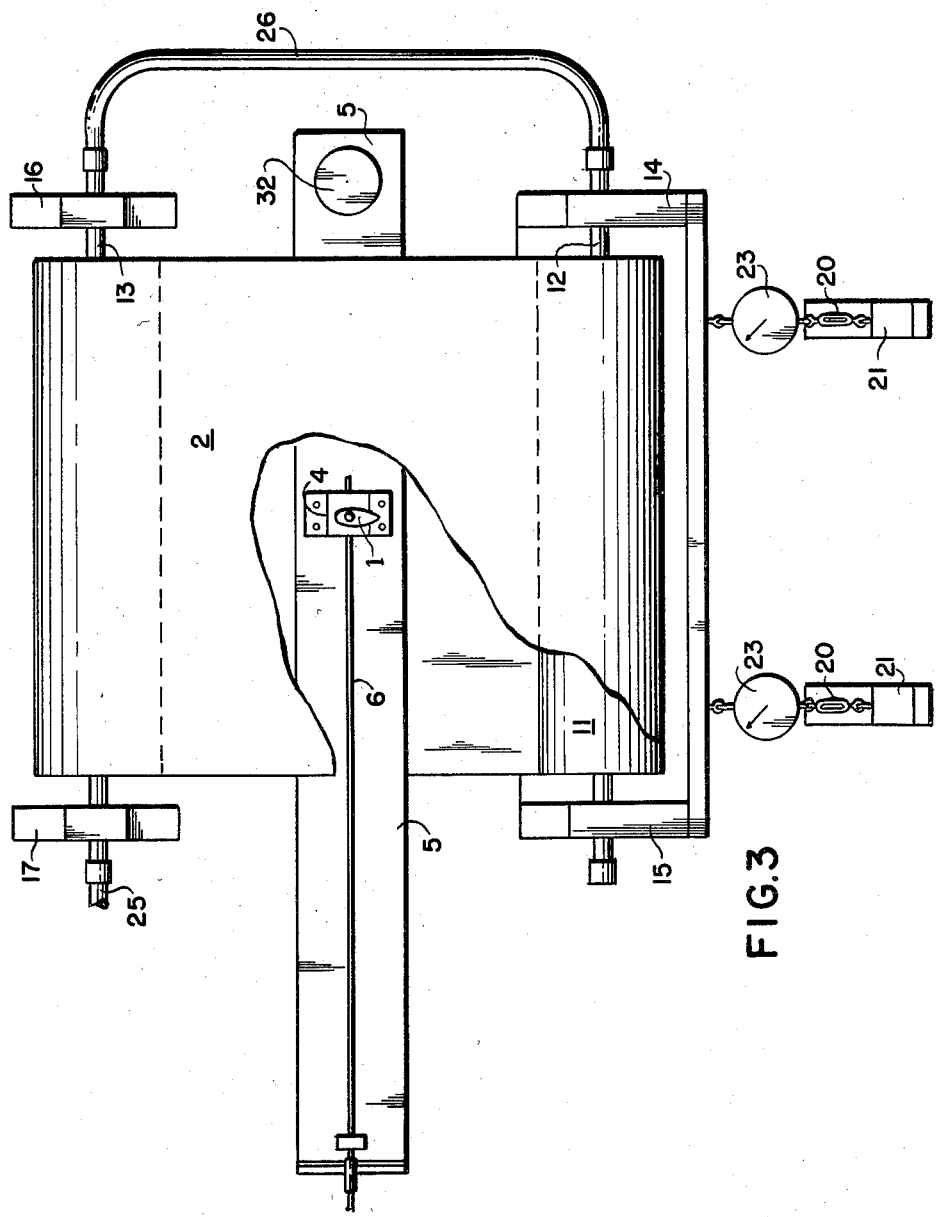

United States Patent Office 2,842,869
Patented July 15, 1958

2,842,869

APPARATUS FOR ANALYZING SHOCK WAVE PATTERNS

Thomas R. Shukay, West Point, N. Y.

Application April 21, 1954, Serial No. 424,633

4 Claims. (Cl. 35—19)

The invention relates to a new and useful method and apparatus for producing and analyzing shock wave patterns.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a top plan view of said apparatus with portions broken away.

Figure 1:
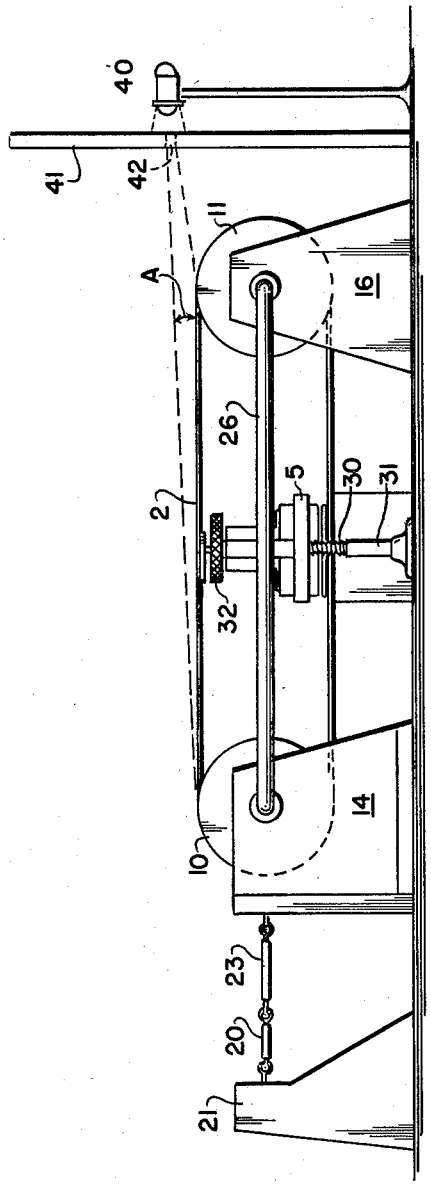
Fig. 1 is a side elevation of an apparatus embodying the invention.
Figure 2:
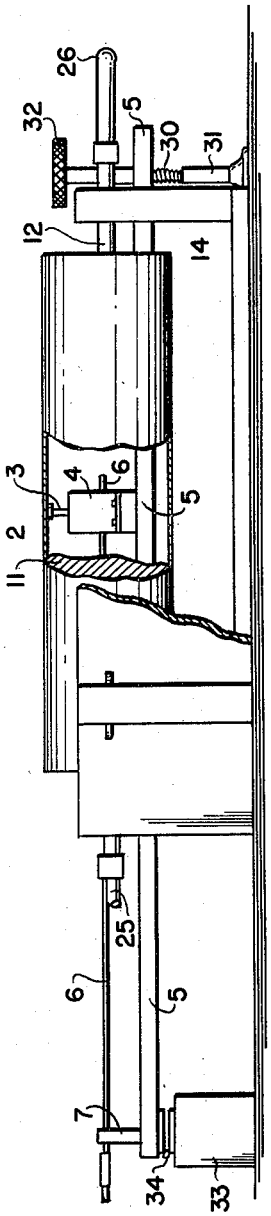
Fig. 2 is an end elevation of the apparatus shown in Fig. 1, parts being broken away to show the interior mechanism.

The principal object of the invention is to create representations of shock wave patterns in air corresponding to those caused by an air foil moving at very high velocities of the order of transonic and supersonic speeds. The wave forms so produced are rendered visible so that they may be observed, studied and recorded. The invention thus may serve as an instructional aid in the study of thermodynamics, aerodynamics and advanced physics. It is also useful as a means for analyzing and assisting in the design of air foils for supersonic travel and like conditions.

Another object of the invention is to produce such shock wave patterns from a wide variety of air foil shapes moving over a wide range of speeds. The preferred apparatus embodying the invention is of simple inexpensive construction and capable of a great range of variations in the speeds of movement of the air foil being examined. It also provides for easily substituting air foils being tested so that a wide variety of shapes can be examined by the same apparatus. The invention thus provides an aerodynamic analogue whereby the wave shock patterns of air foils moving at supersonic speeds may be observed and measured and recorded without the expense and difficulty of reproducing flight conditions either in actual practice or by wind tunnel means.

Various prior attempts to represent shock wave patterns of an air foil moving in air at supersonic speeds include the shadowgraph, the spark-inferometer, and Schlieran photograph methods. To show the patterns of the supersonic air foil, these methods require actual movement of the air foil through the air at supersonic speeds, or wind tunnel conditions, both of which are exceedingly expensive and cumbersome and difficult in operation.

Another known method, called the water plane table method uses a wooden air foil model moving in a water trough. This method is also cumbersome and not truly representative of the air conditions encountered by the air foil, a quite different fluid being employed.

Advantages of the present invention, which provides a visual representation of the shock wave patterns involved, are simplicity, inexpensive construction and facility of controlling and reproducing the desired effects over a wide range of speeds and with a wide variety of air foils.

In investigating the equation for the motion of a pressure variant where the motion under consideration was an infinitely small point source I discovered that the equation was identical for wave motion in a membrane produced by a point source. Since the equations are similar the solutions to the two equations are also similar. As is customary, in the art, the pressure waves of an air foil section are treated as an infinite combination of infinitely small points and the results of such a combination of points are arrived at by a series combination of the equation for a single infinite point. By providing apparatus comprising a thin flexible membrane and moving it at variable speeds across the path of a vibrating or reciprocating air foil form of the desired shape a wave form will be set up in the membrane which will be analogous to the shock wave pattern set up by an air foil section passing through air. If the speed of the membrane passing the point of disturbance (point of vibration) is greater than the speed of propagation in the membrane the shock wave will be analogous to supersonic flight. By means of a stroboscopic light directed at an angle to the vibrating surface of the membrane, the shadow forms of the shock wave patterns are rendered visible on the surface of the membrane. These patterns can be seen visually and may be photographed or otherwise examined and reproduced.

In the preferred embodiment a form 1 having the shape and contours of the air foil to be examined, is mounted to oscillate or vibrate vertically at the desired rate so as to impart its vibratory movement by impact against thin elastic web or membrane 2 which travels transversely to the path of oscillation of the air foil 1. Means for imparting vertical vibratory motion to the air foil comprises a piston 3 to the upper end of which the air foil 1 is transversely fixed. Preferably the foil is removably attached to the piston, as by screw threads, so that various foil members may be interchanged. The piston is mounted to reciprocate vertically in a hollow cylindrical block 4 fixed and supported on a transverse beam 5. A driven rotating shaft 6 is provided with a cam (not shown) for imparting the vertical oscillatory movement to the piston 3. A constant speed power input (not shown) is provided for driving shaft 6 which is mounted in suitable bearings in the block 4 and bracket 7 projecting upwardly from the outer end of beam 5. The speed of rotation of the shaft is preferably of the order of 3000 R. P. M.

Membrane 2, preferably composed of a thin continuous belt or web of plastic material such as vinyl or nylon sheeting preferably about .05 inch thick, is adapted to travel horizontally over the air foil member 1 so that said air foil strikes the bottom face of the upper reach of said web during its vibratory movements. For this purpose the continuous belt or web 2 passes around opposite, horizontally disposed rotatable drums 10 and 11 so that the upper reach of the web lies parallel to and in contact with the upper face of the air foil 1 during a part of the upper vibratory travel thereof. Drums 10 and 11 are suitably supported on axles 12 and 13, respectively, said axles being rotatably mounted in supporting blocks 14, 15 and 16, 17, respectively. The blocks 16 and 17 are fixed in position, while the blocks 14 and 15 are slidable horizontally so as to impart variable tension to the elastic membrane 2. For this purpose the outer ends of blocks 14 and 15 are connected to turn buckles 20, opposite ends of which are connected to fixed blocks 21. By means of said turn buckles the blocks 14 and 15 may be moved toward and away from the fixed blocks 16 and 17, thereby stretching or loosening the web 2. Scales 23 may be provided for indicating the amount of tension so imparted to the web.

Means are provided for rotating the drums and driving the web 2 at variable speeds so that the horizontal travel of the web with respect to the vertically vibrating air foil 1 may be varied within wide limits. For this purpose the shaft 25 may be rotated at any speed up to 1000 R. P. M. The same driving speed is equally imparted to drum 10 by means of a flexible shaft 26 which carries the drive from shaft 25 to the axle 12 of drum 10.

Means are also provided for varying the vertical level of the vibrating air foil 1 and the amplitude of its oscillation with respect to its impingement on the web 2. For this purpose the beam 5 on which the oscillating piston structure 3, 4 is supported is mounted so it may be raised and lowered various amounts. As embodied, the free end of said beam is provided with a threaded opening which engages the threaded surface 30 of the vertical screw jack 31. Elevating and depressing motion may be imparted by hand wheel 32 at the upper end of the threaded shaft 30. The opposite end of beam 5, supported above block 33, is hinged thereto at 34 to accommodate such adjusting movements.

In accordance with the invention, stroboscopic illumination is imparted to the upper vibrating horizontal surface of the web 2, the light rays being directed at an oblique angle to said surface. For this purpose a strobe light 40, set to fluctuate at about 100 R. P. M. less than that of the constant speed motor driving the vibrating air foil 1, is positioned to play across the upper surface of the belt 2 at a very slight angle A. Preferably a vertical screen 41 is mounted between the light and the end of the belt supporting apparatus with a horizontal slot 42 to eliminate unwanted light rays and confine them to a narrow band directed over and at the desired angle to the surface of the membrane 2.

In operation the desired tension is imparted to the membrane by moving blocks 14 and 15 and such tension is indicated by the scales 23. The air foil is caused to vibrate at constant speed, preferably about 3000 R. P. M., and the strobe light playing across the membrane surface, as indicated, develops the shadow forms of the wave patterns. These patterns may be varied by the speed changes of the variable speed drive of the web 2, giving the effect of different air speeds with respect to the foil. Said drive preferably is operated by a speed control calibrated in Mach numbers. The patterns or wave forms so produced in the upper surface of the web can be observed visually and optimum visual images thereof can be obtained by the vertical adjustment of the beam 5. This arrangement permits recording of the patterns by still or motion pictures.

Obviously different types and shapes of air foil designs may be employed by merely replacing different shapes 1, mounted at the upper end of the oscillating piston 3.

The invention in its broader aspects is not limited to the specific mechanisms shown and described, but departures may be made therefrom within the scope of the accompanying claims without departing from the principles of the invention and without sacrificing its chief advantages.

What I claim is:

1. Apparatus for producing wave shock patterns corresponding to those of an air foil moving through air including in combination a flexible membrane, a member shaped to represent an air foil, means for vibrating said member in a path transverse to the plane of said membrane and in contact with said membrane during at least a part of the vibratory movement of said member, and means for moving said membrane in a plane transverse to said vibratory movement of said member.

2. Apparatus for producing and rendering visible wave shock patterns corresponding to those of an air foil moving through air including in combination a flexible membrane, a member shaped to represent an air foil, means for vibrating said member in a path transverse to the plane of said membrane and in contact with said membrane during at least a part of the vibratory movement of said member, and means for moving said membrane in a plane transverse to said vibratory movement of said member, and a stroboscopic light directed to shine upon the vibrating surface of the membrane.

3. Apparatus for producing and rendering visible wave shock patterns corresponding to those of an air foil moving through air including in combination a flexible membrane, a member shaped to represent an air foil, means for vibrating said member in a path transverse to the plane of said membrane and in contact with said membrane during at least a part of the vibratory movement of said member, variable-speed means for moving said membrane in a plane transverse to said vibratory movement of said member, and a stroboscopic light directed to shine upon the vibrating surface of the membrane.

4. Apparatus for producing wave shock patterns corresponding to those of an air foil moving through air including in combination a flexible membrane, a member shaped to represent an air foil, means for vibrating said member in a path transverse to the plane of said membrane and in contact with said membrane during at least a part of the vibratory movement of said member, means for imparting different tensions, to said membrane, and means for moving said membrane in a plane transverse to said vibratory movement of said member.

References Cited in the file of this patent

UNITED STATES PATENTS

| | | |
|---|---|---|
| 2,278,510 | Condon | Apr. 7, 1942 |
| 2,527,208 | Berry et al. | Oct. 24, 1950 |